United States Patent
Ånäs et al.

(10) Patent No.: US 11,091,610 B2
(45) Date of Patent: Aug. 17, 2021

(54) METHOD AND COMPOSITION OF MAKING POLYMER PRODUCTS

(71) Applicant: Uponor Infra Oy, Vantaa (FI)

(72) Inventors: Tommy Ånäs, Vantaa (FI); Hannes Mero, Lahti (FI)

(73) Assignee: Uponor Infra Oy, Vantaa (FI)

( * ) Notice: Subject to any disclaimer, the term of this patent is extended or adjusted under 35 U.S.C. 154(b) by 167 days.

(21) Appl. No.: 16/330,109

(22) PCT Filed: Sep. 4, 2017

(86) PCT No.: PCT/FI2017/050622
§ 371 (c)(1),
(2) Date: Mar. 4, 2019

(87) PCT Pub. No.: WO2018/042082
PCT Pub. Date: Mar. 8, 2018

(65) Prior Publication Data
US 2019/0233628 A1    Aug. 1, 2019

(30) Foreign Application Priority Data
Sep. 2, 2016   (FI) ..................................... 20165653

(51) Int. Cl.
| | |
|---|---|
| *C08L 23/06* | (2006.01) |
| *C08J 3/22* | (2006.01) |
| *C08J 11/06* | (2006.01) |
| *C08J 3/00* | (2006.01) |
| *C08J 3/20* | (2006.01) |
| *C08L 23/08* | (2006.01) |
| *F16L 9/16* | (2006.01) |

(52) U.S. Cl.
CPC ............... *C08L 23/06* (2013.01); *C08J 3/005* (2013.01); *C08J 3/201* (2013.01); *C08J 3/226* (2013.01); *C08J 11/06* (2013.01); *C08L 23/0846* (2013.01); *F16L 9/16* (2013.01); *C08J 2323/06* (2013.01); *C08J 2323/12* (2013.01); *C08J 2323/20* (2013.01); *C08J 2423/06* (2013.01); *C08J 2429/06* (2013.01); *C08L 2203/18* (2013.01); *C08L 2205/025* (2013.01); *C08L 2207/20* (2013.01); *C08L 2310/00* (2013.01); *C08L 2312/00* (2013.01)

(58) Field of Classification Search
CPC ....... C08L 23/06; C08L 23/0846; C08J 3/005; C08J 3/226; C08J 11/06; F16L 9/16; F16L 9/18; F16L 9/19; F16L 9/20
USPC ................................ 428/36.9, 36.91, 36.92
See application file for complete search history.

(56) References Cited

U.S. PATENT DOCUMENTS

| | | |
|---|---|---|
| 4,056,421 A | 11/1977 | Jarvis |
| 6,638,589 B1 | 10/2003 | Järvenkylä |
| 2009/0075004 A1 | 3/2009 | Starita |

FOREIGN PATENT DOCUMENTS

| | | |
|---|---|---|
| CN | 1162263 C | 8/2004 |
| CN | 102093580 B | 8/2012 |
| CN | 104974393 A | 10/2015 |
| DE | 4236802 A1 | 5/1994 |
| DE | 19503519 C1 | 5/1996 |
| EP | 0847842 A1 | 6/1998 |
| EP | 3159127 A2 | 4/2017 |
| WO | WO 2016102341 A1 | 6/2016 |

OTHER PUBLICATIONS

Boss et al: New technology for recycling of plastics from cable waste. Jun. 23, 2011, 8th international conference on insulated power cables. p. 4.
Gouttefrade et al: Mechanical recycling of XLPE from cable production waste. Dec. 31, 2009, pp. 16-20, 36.
Fusion welding of crosslinked PE. https://www.pe100plus.com/PPCA/Fusion-Welding-of-Crosslinked-PE-p128.html.

*Primary Examiner* — Edward J Cain
(74) *Attorney, Agent, or Firm* — Laine IP Oy

(57) ABSTRACT

A method and composition of making polymer products from thermoplastic polymers by melt processing. Cross-linked polyethylene are mixed with at least one thermoplastic matrix polymer to form a polymer composition which is melt-processed. The cross-linked polyethylene is formed by a finely divided powder with particles having a screened size of less than 600 μm and a $D_{50}$ of 200 to 400 μm. Cross-linked polyolefin can be used in a cost-effective and simple manner so that products generally considered a waste, such as scrapped cross-linked polyethylene pipes or unused cross-linked polyethylene discarded in e.g. pipe making processes, can be recycled and used as a starting material for polymer products.

10 Claims, 1 Drawing Sheet

METHOD AND COMPOSITION OF MAKING POLYMER PRODUCTS

FIELD

The present invention relates to a method according to the preamble of claim 1 of making thermoplastic polymers by melt-processing. According to such a method, cross-linked polyolefin, such as polyethylene, is mixed with matrix polymer to form a meltable polymer composition which is melt-processed.

The present invention also relates to a composition and its products according to the preambles of claims 5 and 9.

BACKGROUND

Recycling of polymer materials is often costly and complex. This is particularly true for polymers that have been cross-linked, since cross-linking makes the material resilient to high temperatures. Remelting of the material as such is difficult, if not impossible. Therefore, polymeric material scraps are conventionally combusted.

Recycling of polymer waste materials is suggested in DE 42 36 802 and DE 19 503 519. DE 42 36 802 discloses milling together polymer waste materials to provide a homogeneous blend which can be used for moulding. DE 19 503 519 suggests that recycled cross-linked polyethylene pipes in shredded form be combined with another cycled polymer to form a polymer blend which is incorporated into product streams of petrochemical refining.

Further, in the art, a method is known for recycling of cross-linked polyethylene by grinding the material to powdered form and then mixing the powder with a base material to produce plastic products. Reference is made to the disclosure of EP 0 847 842. In the known method, the proportion of ground cross-linked polyethylene used with polyethylene is low, less than 30% by weight but preferably only about 10% by weight. Only at the indicated low loadings, the mixture mixes sufficiently, and the cross-linked polyethylene powder mixed with the base material will not impair the final product, even though it does not melt.

Further art is represented by US 2009/0075004 and WO 2016/102341.

US 2009/0075004 discloses mixing PEX particles with polyethylene which is cross-linked. Such a thermoset product is neither weld able nor recyclable.

WO 2016/102341 discloses mixing mineral fillers, such as calcium carbonate or talc, together with granules of electrical cable PEX, having a size of about 1 mm, with polyethylene, and compounding the mixture before injection or compression moulding. It would appear that, in particular at higher loadings of the PEX filler, there is no improvement of mechanical properties of the products in comparison to pure polyethylene. And due to a mineral filler content of up to 40% by weight, the polymers will have a high ash residue upon combustion.

As will appear from the foregoing, in the art the proportion of cross-linked polyethylene needs to be low because it has been found that cross-linked polymer components are not readily compatible with thermoplastic materials, which impairs melt processing.

SUMMARY OF THE INVENTION

It is an aim of the present invention to eliminate at least part of the problems relating to the known art and to provide a new method and composition of making polymer products.

In the invention, cross-linked polyethylene (PEX) is ground to powdered form comprising finely divided particles which are then mixed with a thermoplastic polymer, usually non-cross-linked polyolefin, such as virgin polyethylene (PE), to form a mixture.

Thus, in one aspect of the present invention, a powder of finely divided PEX having a particle size of less than 600 µm and typically a $D_{50}$ of 200 to 400 µm, for example about 300 µm, is used as a component of polymer blends for melt processing.

In a further aspect, cross-linked polyethylene is mixed in finely divided form with a thermoplastic polymer and compounded to form a master batch of granules containing from about 30 up to about 80% of cross-linked polyethylene calculated from the total weight of the composition.

Further aspects of the invention comprises products such as pipes and polymer profiles produced from mixtures of cross-linked polyethylene and non-cross-linked thermoplastic polymers and subjected to further polymer processing by conventional means, such as welding.

It has also been found that such finely divided cross-linked polyethylene can be employed as a filler in polymers. By incorporating PEX into thermoplastic materials as filler it is possible at least partially to replace conventional mineral fillers. Further, the adhesion between the PEX filler and the thermoplastic is good. Thus, by using PEX as a filler, instead of a mineral filler, the weight of a filler-containing polymer material can be reduced and strength properties improved.

In another aspect, it has been found that the proportion of the PEX in the mixture can amount to 10% by weight or more, even up to 60% by weight of the total polymer material without significantly impairing the weldability of articles made from the mixture.

More specifically, the invention is characterized by what is stated in the characterizing portions of the independent claims.

Considerable advantages are obtained by the present invention. Thus, cross-linked polyolefin can be used in a cost-effective and simple manner so that products which conventionally were considered as waste, such as scrapped PEX pipes or unused PEX discarded in e.g. pipe making processes, can be recycled and used as a further source of material for producing polymer products.

Once the PEX fine particles are incorporated into the polymer matrix, they serve as filler in the material. Conventional mineral fillers can be avoided partly or totally.

As a filler, finely ground PEX further offers distinctive advantages over mineral fillers. Thus, when mixed with polyolefin matrices, for example polyethylene, PEX will increase the strength of the matrix because of good compatibility with the polyolefin main chains when compared to mineral filled PE-products. Therefore a polymer composition formed by a mixture of PEX and, for example, polyethylene has better mechanical properties than the corresponding composition containing a mineral filler mixed with polyethylene.

The present fillers stabilize and strengthen polymer structures.

Thus, a smaller shrinkage will also reduce the formation of mechanical stress inside the material. This is a particularly important advantage for the mechanical strength properties of structures which are manufactured from extruded, elongated thermoplastic pipes and profiles which are bent or coiled after extrusion and cooling of the elongated structure.

Advantages are also obtained in manufacturing of massive polymer articles by melt processing. Massive polymer articles typically have a smallest thickness of more than 10 mm and typically comprise portions the smallest dimension of which is greater than 25 mm. Such articles can be manufactured for example by pressure moulding.

Conventionally, shrinkage of the material caused by cooling will give rise to the formation of cavities within the material, such as internal closed cells. By the use of the present fillers, the formation of such internal cavities can be avoided.

Further, when the filled plastic materials are recycled and combusted, ash will be reduced. Ash residues are minerals that are left behind in the process of incineration, and mineral fillers are one main cause of ash residues. Thus by replacing the mineral fillers with PEX, significant cost can be saved in ash residues management.

A PEX-filled polymer composition is lighter than a polymer composition filled with a mineral filler. For example, a composition containing 30 wt % of mineral filler is 20% heavier than the corresponding composition containing 30% PEX.

The cross-linked polyethylene composition can be melt processed into articles that are in the form of tubes and pipes. This is surprising since it could have been expected based on the thermoset properties of PEX that large loadings of such material would impair welding of the thermoplastic material. However, in connection with the present invention it has been found that when the polymer matrix is formed by a thermoplastic, such as a polyolefin, for example polyethylene, there is still a sufficient amount of thermoplastic at the surface of polymer articles produced from the material to allow for welding of the products. As will be discussed below, it is also possible to improve weldability by providing the articles with additional skin layers of weldable materials, such as thermoplastics, in particular polyolefins, for example polyethylene.

In this respect it can also be noted that for polymers containing mineral fillers, weldability is notoriously poor.

In preferred embodiments, the present polymer compositions are free or essentially free from mineral fillers. In particular the content of mineral fillers is less than 1% by weight (of the total composition).

Due to at least reasonably good weldability, PEX-filled thermoplastic can be manufactured by conventional plastic processing into polymer articles, such as pipes and profiles, which are to be welded together.

In one embodiment, polymer profiles are provided which can be welded together to form objects in the form of pipes or plates.

In one specific embodiment, polymer profiles having rectangular or quadratic or other off-circular cross sections are provided. Such profiles provide the building blocks or starting materials of further products, such as double-walled pipes formed by winding of the profiles into coils which are laterally welded together.

Next embodiments of the invention will be discussed in more detail with the aid of the attached drawing.

DEFINITIONS

Figure 1:
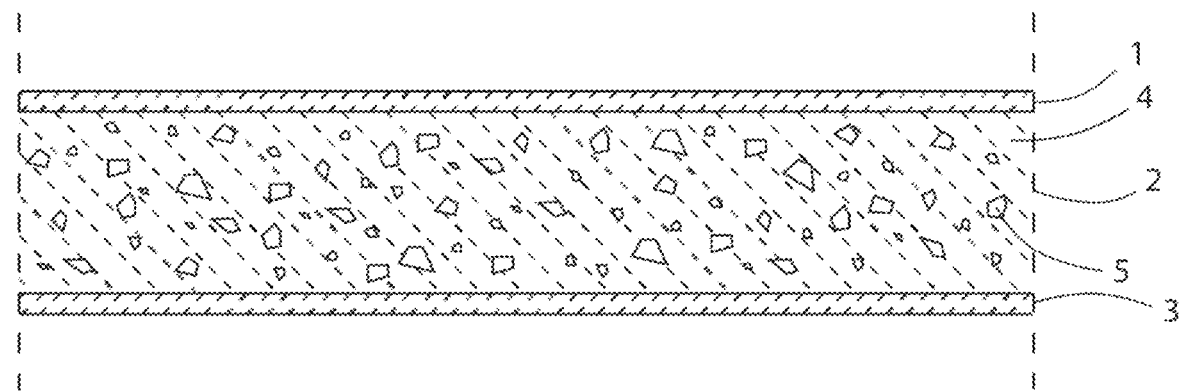
FIG. 1 is a schematic drawing of the wall structure according to one embodiment of the present invention.

In the present context, the abbreviation "PEX" stands for cross-linked polyethylene. The term "cross-linked polyethylene" and "PEX" includes various PEX grades independently of how the cross-linking has been achieved. Thus, "cross-linked polyethylene" and "PEX", respectively, covers PEXA, PEXB as well as PEXc grades.

"Polyolefin" is a term that describes a class of polyalkene, such as polyethylene and polypropylene.

"Welding" in the present context and when used for polymers means permanently joining two pieces of thermoplastics together at the parts that touch by at least partially melting the polymer material and optionally adding more polymer melt.

"Thermoplastics" are polymers that become soft and mouldable when subjected to heat and solidfy upon cooling.

"Base material" of "base polymer" stands for thermoplastic material used, for example in the form of granules or pellets, for making polymer products by melt processing such that the base material after solidification of the melt forms the continuous matrix of the products. The thermoplastic material can be a neat polymer or a blend of polymers.

"Master batch" stands for a quantity of material composed of a polymer blend, in an isolated form and prepared for an operation, such as incorporation into polymer.

"Screened size" refers to particles which will pass through a screen having a predetermined size of the apertures. Thus, a "screened size of 600 µm" means that the particles will pass through screens having apertures of that size.

"$D_{50}$" is the median diameter or the medium value of the particle size distribution. It is the size of the particle diameter of 50% of the particles. After recovery of the screened material, particle size can be determined optically or by x-ray analysis, for example using a Sedigraph. Particle size can also be determined using a set of sieves having a predetermined size of their openings. For example, the milled material can be subjected to sieving on at least 2, preferably 3 to 15, sieves of different mesh.

"Post-industrial waste" is defined as scrap material generated as a result of an industrial process.

"Pre-consumer materials" are recovered materials obtained from manufacturers such as cutting scraps.

Percentages are given as weight-% unless otherwise stated.

EMBODIMENTS

According to a first embodiment, the present technology relates to a method of making polymer products, in particular thermoplastic polymer products, from thermoplastic polymers by melt processing, wherein cross-linked polyethylene is mixed with at least one thermoplastic matrix polymer to form a polymer composition which is melt-processed. The cross-linked polyethylene is a finely divided powder. The polymer composition is free from cross-linking agents. Thus it is capable of providing a thermoplastic material by melt-processing.

A suitable cross-linked polyethylene material is obtained by recycling waste products, such as materials selected from the group of post-industrial or pre-consumer materials. Examples include off-grade products, such as pipes, and scraps. This will be discussed below.

Cross-linked polyethylene (abbreviated PEX) is widely used in the building, plumbing and mining industries and generally in piping for infrastructure. It is also used as a material in electrical cables, storage tanks, and radiant heating products, as well as in medical and dental applications. A majority of waterproof polymer-containing commercial products contain PEX optionally together with barrier materials, as will be discussed below.

Because of the wide use of PEX, waste products comprising PEX are also abundant. Post-industrial waste is a suitable source of PEX material. Scrap PEX material generated as a result of industrial manufacturing processes, can be recovered and recycled. Examples include PEX pipes which are off-grade and have to be discarded. Another source of PEX is formed by pre-consumer materials where materials obtained from manufacturers, such as cutting scraps, are increasing in volume. Conventionally, the PEX waste is combusted. The present technology provides for efficient recycling of PEX by incorporating it into polymer products.

Thus in an embodiment of the present technology, PEX from various sources is reused as a material for manufacturing polymer products, such as pipes and profiles, while maintaining good strength properties, which means that considerable amounts of virgin polymers can be replaced with recycled material.

As mentioned above, in the present technology, any PEX material can be employed. However, with regard to filler use, it has been found that particularly good results are obtained for PEX grades PEXA and PEXc, PEXA being used in the below example (cf. FIG. 2) wherein a good balance is obtained between internal strength of filled material and proper weldability of the polymer.

The PEX material, in particular PEX waste material, is ground to produce a finely divided material. Grinding can be carried out with any pulverizing equipment and mill suitable for grinding and/or pulverizing of polymer resins, in particular thermoplastic materials. Examples of suitable equipment include disc mills, ball mills, hammering mills, high shear rotary mills, and cutting mills, such as knife mills. In one embodiment, since milling or grinding involves heat generation, grinding is carried out at cooled conditions, for example at cryogenic conditions.

Grinding is continued until a powder is obtained. The material is sieved so as to remove particles greater than about 600 μm. Such particles can be recycled to grinding.

Preferably milling and sieving is carried out such that a powder is obtained with an average particle size, $D_{50}$, of about 300 μm or generally $D_{50}$ of 200 to 400 μm. In the present context, the "about 300 μm" stands for 300 μm±10%, in particular 300 μm±5%.

In one embodiment, up to 30% by weight of the particles have a screened size smaller than 400 μm. In one embodiment, up to 8% of the weight of the particles have a screened size smaller than 200 μm.

Typically, the finely divided cross-linked polyethylene comprises particles have a narrow particle size distribution. In such a particle size distribution, the amount of particles having a screened size smaller than 200 μm is less than 10%, in particular less than 5% by weight and the amount of particular having a screened size greater than 400 μm is smaller than 10%, in particular less than 5% by weight.

In one embodiment, the finely divided cross-linked polyethylene is provided in the form of a dry powder. In particular the finely divided cross-linked polyethylene is provided in the form of powder having a moisture content of less than 10% by weight, in particular less than about 7.5% by weight, typically of about 0.1 to 5% by weight.

In an embodiment, a PEX powder as explained in the foregoing is mixed with a base polymer, such as a polyolefin, capable of forming the matrix of a polymer article, in amounts of up to 60% by weight.

While the polyolefin forms the matrix of the polymer article, the powder is used as a polymeric additive or filler to form a composition which can to be melted-processed to form plastic articles.

Based on the above, in an embodiment a plastic product is made by extrusion or moulding, the product comprising a base material, such as a polyolefin or mixtures thereof, which forms the matrix of the material, and cross-linked polyethylene (PEX) which forms a filler part of the material.

In one embodiment, thermoplastic material containing PEX powder as a filler is used in extrusion to form extruded elongated articles, in injection moulding or compression moulding to form moulded articles.

In some embodiments, the PEX fine particles to be incorporated into the polymer matrix have irregular shapes and their sizes vary within the predefined range.

Shrinkage usually takes place melt processed articles upon cooling, and the extent of shrinkage is affected by various factors such as cooling time, mould temperature or resin melt temperature, and is often sensitive to injection pressure. Shrinkage of the extruded or moulded articles is undesirable as it causes uncompensated volumetric contraction of the articles. It has been found that by varying the amount of the PEX powder being added to the composition the extent of thermal shrinkage is subsequently reduced and controlled.

In all of the above embodiments, cross-linked polyethylene and the base polymer(s) are mixed at a ratio of about 5 to 60, in particular 10 to 50, for example 15 to 40 parts by weight of cross-linked polyethylene to 40 to 95, in particular 50 to 90, for example 60 to 85 parts by weight of base polymer.

The base polymer is preferably a thermoplastic polymer.

One particularly interesting class of thermoplastic polymers to be used in mixture with cross-linked polyethylene are the polyolefins. As well known in the art, polyolefins are a class of polymers produced from olefin monomers, such as ethylene, propylene methylpentene and butene providing polyolefins such as polyethylene, polypropylene, polymethylpentene and polybutene-1. Polyolefins are commonly used in industry for their thermoplastic properties. They are pliable or mouldable above specific temperatures. Thus, they can be moulded into a desired configuration that solidifies upon cooling.

In particular, the base polymer is formed by non-cross-linked polyolefins selected from the group of polyethylene and polypropylene. The polyethylene can be selected from the group of low-density, medium-density and high-density polyethylene. Optionally, the polyethylene can be linear low-density polyethylene.

The base material is preferably used in the form of a virgin material although it is, naturally possible also to employ recycled thermoplastic materials.

The finely divided cross-linked polyethylene material can be fed either directly to melt-processing or be mixed with the base material to form a batch (master batch) to be used later for melt-processing.

Thus, in a first embodiment, the cross-linked polyethylene powder is incorporated into the polymer feed of plastics processing equipment. Typically the polymer feed comprises or consists of granule of a thermoplastic material. In particular the cross-linked polyethylene powder is mixed with a base polymer comprising non-cross-linked polyolefin to form a mixture which is processed by applying heat and optionally shear forces and pressure in order to shape the mixture into a predetermined form. Such a process can be selected in particular from the group of extrusion, injection moulding, press moulding and rotational moulding.

The cross-linked polyethylene powder can be mixed at a ratio of 5 to 60, in particular 10 to 50, for example 15 to 40 parts by weight to 40 to 95, in particular 50 to 90, for example 60 to 85 parts by weight of a non-cross-linked polyethylene for example in the form of granules. The mixture thus obtained can be complemented with pigments and conventional polymer additives for example in amounts of up to 10% by weight of the polymers.

In a second embodiment, pulverised PEX is compounded with the base material, i.e. non-cross-linked polyethylene, to form a master batch (MB) which is then fed at a predetermined rate into a feed of non-cross-linked polyolefin to form a blend from which polymer articles are produced by conventional plastics technology.

One embodiment comprises preparing a master batch by forming a mixture of 10 to 95, in particular 30 to 80, for example 50 to 75 parts by weight of a non-cross-linked polyethylene for example in the form of granules, 5 to 90, in particular 20 to 70, for example 25 to 50 parts by weight of cross-linked polyethylene powder, optionally together with pigments and conventional polymer additives for example in amount of up to 25% by weight of the polymers. The mixture is heated at a temperature which, depending on the density of the non-cross-linked polyethylene, lies in the range of 105 to 180° C. or higher in order to melt the non-cross-linked polyethylene. Typically, melt-mixing is carried out at sufficient shear-forces to allow for intimately contacting the components with each other. After melt-mixing the mixture is cooled and optionally cut into granules. Melt-mixing of the blend for compounding the master batch is typically carried out by extrusion. It has been found that a master batch of the above kind can be produced even in a single-screw extruder, although multiple screw extruders can be employed as well.

The master batch is typically mixed at a predetermined proportion with a non-cross-linked polyolefin, the latter typically being provided in the form of granules. The weight ratio of master batch to non-cross-linked polyolefin is, depending on the predetermined content of the cross-linked polyethylene in the final product, typically 1:100 to 100:1, in particular 1:10 to 10:1, for example 1:2.5 to 1:5.

An advantage of preparing a master batch is that the recycled PEX can be stored in the master batch without the need of strict control of storage condition The melt processing of the combined feed of master batch and base polymer material can be carried out by applying heat and optionally shear forces and pressure in order to shape the mixture into a predetermined form. Thus, just as discussed above, such a process can be selected from the group of extrusion, injection moulding, press moulding and roto moulding.

It should be noted that PEX waste can, depending on the use of the material, contain other polymeric components, such as barrier materials, in particular barrier layer materials for plastic products which give the products properties of reduced permeability to gases such as oxygen, nitrogen, carbon dioxide and helium. One common component is ethylene vinyl alcohol copolymer (EVOH). Typically, EVOH can be present in amounts of up to 10% by weight, in particular at about 0.01 to 5% by weight of a PEX material.

Surprisingly it has been found that EVOH does not impair the use of powdered PEX as a component of polymer blends with non-cross-linked thermoplastics, in particular polyolefins. Thus, generally, a polymer composition according to one embodiment comprises, in addition to cross-linked polyethylene and non-cross-linked polyolefin also some EVOH, in particular 0.001 to 5% by weight of EVOH calculated from the total weight of the other polymers.

Conventionally, the EVOH films are bonded to neighboring materials, such as PEX, with adhesives or glues (polymeric, thermosetting materials). Therefore, recycled PEX grades will often contain residues of such adhesives or glues. Typically, the amount of any glue or adhesive residues is less than 0.0001 to 2.5% by weight of the cross-linked ethylene. In connection with the present technology it has been found that such residues do not either impair the use of the PEX in polymer blends as explained above.

In one embodiment, polymer compositions containing up to 60% by weight, in particular 10 to 50% by weight, together with polymers which have thermoplastic properties, such as non-cross-linked polyolefins, are used for producing polymeric articles which are welded. Although cross-linked polyethylene does not essentially melt at the same temperatures as the non-cross-linked polyolefin, it has surprisingly been found—as already briefly referred to above—that by having the matrix of the polymer articles formed by non-cross-linked polyolefin and by incorporating the cross-linked polyethylene as a powder into the polyolefin matrix, at least reasonably good welding properties are achieved.

In one embodiment, polymer compositions are provided which have a density of less than 1000 kg/m$^3$, in particular less than 980 kg/m$^3$, typically 900 to 960 kg/m$^3$, for example 940 to 960 kg/m$^3$.

In one embodiment, polymer compositions are provided which contain 70% by weight or less of thermoplastic polymer, which forms the matrix of the composition, and 30% by weight or more of a polymeric filler, said filled comprising cross-linked polyethylene in finely divided form and said composition being weldable.

In one embodiment, polymer compositions are provided which contain 70% by weight or less of thermoplastic polymer, which forms the matrix of the composition, and 30% by weight or more of a polymeric filler, said filled comprising cross-linked polyethylene in finely divided form, said composition being weldable and said compositions having a density of 900 to 960 kg/m$^3$, for example 940 to 960 kg/m$^3$.

Welding of polymer articles formed by the present polymer compositions can be carried out as known in the art by melting a part, typically at least a part of the surfaces, of the polymer articles which are to be joined. The molten surfaces of the articles are placed in abutting relationship and the articles will be attached to each other when the melt solidifies. It is also possible to apply molten polymer on the joint between the surfaces that are being joined together. The molten polymer will attach to the surfaces and at least partially melt them to achieve a durable joint.

In the present context, "weldable", when used in connection of the polymer articles and polymer products, implies that the articles or products when welded will give a welding joint which has equal or greater strength than the adjacent portions of the articles or products. Thus, typically, when a welded structure is subjected to mechanical forces, a breaking of the structure will primarily not take place in the welded joint.

Conventionally, plastics welding can be carried out by extrusion welding, contact welding, friction welding, speed tip welding, hot plate welding, high frequency welding, induction welding, ultrasonic welding and laser welding.

Various pipe products can be formed out of different sort of configurations via welding, i.e. a plate-like construction with several elongated profiles of thermoplastic material can be arranged in such a way that adjacent hollow profiles abutting each other. One advantage of the PEX incorporated thermoplastic material is for its resistance to shrinkage without compromising its weldability. Optionally, a layer of polyolefin can be arranged on the surface of the pipe profiles further assisting the welding process.

Thus, in one embodiment, a polymer article is provided in the form of a shaped object having an inner surface and an outer surface, and a cross section, said tube comprising polymer material containing up to 60% by weight of a finely divided cross-linked mixed with at least one polyolefin, said cross-linked polyethylene having a screened particle size of less than 600 μm and a $D_{50}$ of 200 to 400 μm The present technology also provides for the production of multi-layered products. In one such embodiment, the polymer article has a skin layer on either the inner surface or the outer surface or both, said skin layer being formed by, or consists of, a thermoplastic material, such as a virgin polyolefin material or another weldable thermoplastic polymer. Such a skin layer will enhance welding of the articles. Thus, in one embodiment, by co-extruding a middle layer filled with PEX together with skin layers of polyolefin, such as non-cross-linked polyethylene, on either or both side, the extrusion of the skin layers will assist in maintaining a reasonably high output of the extruder even if there were some increase of viscosity of the middle layer during extrusion.

One embodiment comprises providing the polymer article in the form of a polymer pipe or polymer profile having a hollow cross-section, the pipe or profile having a wall formed by said polymer material. The embodiment also includes the alternative that the polymer pipe or profile has a multi-layered wall with a skin layer on at least the outside of the article.

Pipes suitable for use e.g. as conducting fluids can be provided. The formed tubes can be welded to further tubes, e.g. they can be welded end to end, or butt welded, to form longer tubes.

In another embodiment, pipes or profiles which are laterally welded together are provided. Such profiles can be hollow and they have, for example a non-spherical cross-section, such as a rectangular cross-section. The laterally welded profiles can form an essentially planar surface comprising a plurality of tubes that is suitable for use as e.g. boards, plates and panels in various buildings and structures. Boards and panels manufactured from laterally welded profiles are manufactured and marketed under the names of Wehopanel and Wehoboard by Uponor Infra Oy.

Further, hollow profiles according to embodiments of the invention can be wound in a helix or a spiral of one or more turns to provide a polymer product. The outer surfaces of the tube can be welded laterally along the turns of the helix or spiral to provide a pipe having a double wall structure. The subsequent elongated pipe profile can be described as having a double wall structure around a lumen. Such a double wall structure is a very useful feature in pipe products, providing additional structural integrity. Pipes of the indicated type are manufactured and marketed under the name Weholite by Uponor Infra Oy.

Turning first to FIG. 1 it can be noted that a pipe wall according to one embodiment of the present invention contains a middle layer 2, which is placed between two skin layers 1, 3, one on each side. The middle layer 2 is composed of a thermoplastic polymer which forms a continuous matrix 4 and it further contains particles 5 of cross-linked polyethylene which are dispersed throughout the polymer matrix.

Skin layers 1 and 2 on both sides of the profile consist of non-cross-linked polyolefin. The skin layer covers the underlying surface of the middle layer totally.

Figure 2:
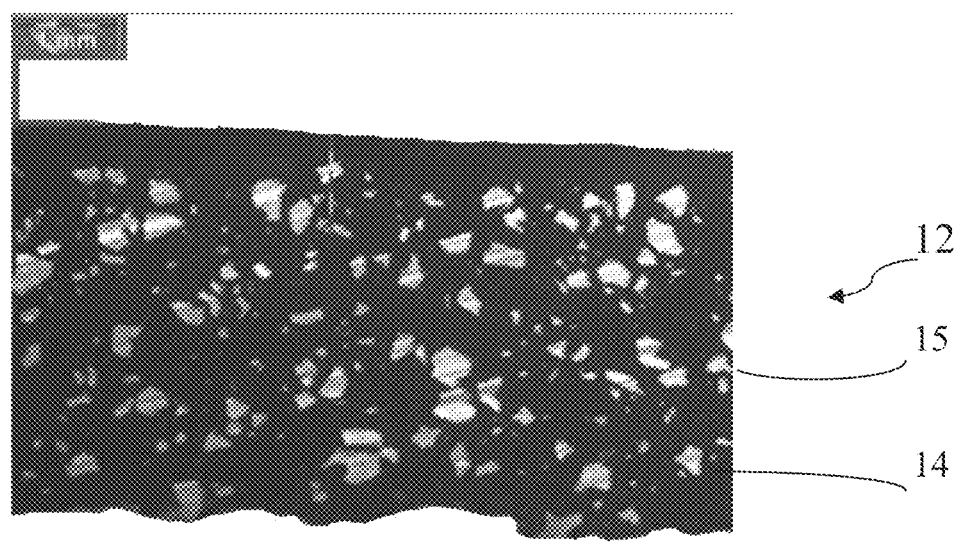
FIG. 2 is a microscopic image showing a partial cross-section of the wall of a polymer profile produced by extrusion moulding of a polymer blend according to one embodiment of the present invention.

FIG. 2 shows the cross-section of a hollow profile manufactured according to one embodiment of the present technology. As will appear, the polymer wall comprises a layer 12 which in the micrograph is fit between two glass plates (not shown). The layer 12 is formed by a thermoplastic polymer, preferably polyethylene 14, which is filled with particles of cross-linked polyethylene 15.

In the embodiment shown in FIG. 2, the skin layers (i.e. the surface portions of layer 12) are free from such particles. The cross-linked polyethylene comprises post-industrial waste or pre-consumer materials (PEX/EVOH), which has been ground into irregularly shaped particles (<600 μm), which are evenly distributed inside the polyethylene layer 12. The amount is about 30% by weight.

Since the cross-linked material has polyethylene main chains, compatibility of the particulate material 15 with the matrix material 4 is good.

The following non-limiting examples illustrate the invention:

Example 1

Scrapped PEX was used in powder form (particles with a screened size of less than 600 μm) as a filler in ROTO moulded chambers. PEX-powder was added at 5, 10 and 20% by weight into the mold together with virgin polyethylene (1741 Black). Oven time was about 20 min.

The results are given in Table 1

TABLE 1

|  |  | 1 | 2 | 3 | 4 |
|---|---|---|---|---|---|
| PEX |  | 0 | 5% | 10% | 20% |
| PE1741 |  | 100 | 95% | 90% | 80% |
| Metre weight | g/m | 7359 | 7235 | 7238 | 7377 |
| Ring stiffness | kN/m² | 0.36 | 0.37 | 0.39 | 0.38 |
| e avg. | mm | 5.72 | 5.54 | 5.85 | 6.34 |
| tensile strength at yield | MPa | 20.3 | 20.1 | 19.1 | 18.4 |
| tensile strength at break | MPa | 11.2 | 11.2 | 9.6 | 9.1 |
| elongation at break | % | 402 | 310 | 128 | 75 |
| elongation at break std dev | % | 55 | 60 | 93 | 54 |
| tensile modulus | MPa | 972 | 970 | 824 | 826 |
| density | kg/l | 0.925 | 0.940 | 0.916 | 0.903 |

Based on the results and considering the gentle mixing process in ROTO molding it can be stated that a quite good compatibility and adhesion between the PEX particle and the PE matrix is evident.

Example 2

Three-layer cable conduit DN110 pipes were produced using polyethylene (Marlex 5502), a masterbatch comprising PEX particles (<600 μm) in the middle layer. The results are shown in Table 2

TABLE 2

|  | Ref | Sample 1 | Sample 2 |
|---|---|---|---|
| Middle layer: |  |  |  |
| PE (%) | 100 | 45 | 25 |
| PEX-MB (%) |  | 39 | 59 |
| PEX in middle layer (%) |  | (20) | (30) |

TABLE 2-continued

|  | Ref | Sample 1 | Sample 2 |
|---|---|---|---|
| Outer/inner layers: |  |  |  |
| Marlex 5502 (%) |  | 12/4 | 12/4 |
| Density (kg/l) | 0.955 | 0.948 | 0.946 |
| Meter weight (g/m) | 1575 | 1600 | 1478 |
| RS (kN/m$^2$) |  | 10.9 | 8.2 |
| Impact Str. (−10 C.°/12.5 kg) |  | >2 m | >2 m |
| Crow bar IS. (−10 C.°/10 kg) |  | ~0.7 m | ~0.4 m |

As will appear from the results, impact strength of PEX/Marlex 5502 pipes was excellent.

Example 3

Large-diameter pipes consisting of spirally wound polymer profiles laterally welded together to form a hollow pipe wall of the large pipes (products typically of the kind supplied by Uponor Oyj under the name of Weholite®) were produced from 3-layered polymer profiles having a middle layer formed by polyethylene and containing PEX filler in the form of a powder.

The polymer profiles were manufactured by coextrusion, using mixtures of Hostalen 5052B and PEX powder, <600 μm, pulverized by a Pallmann knife mill, for the middle layer and Liten PL10 for outer layers of profile. Liten PL10 was also used for welding the pipe profiles together.

The results are given in Table 3.

TABLE 3

|  |  | Sample 1 | Sample 2 |
|---|---|---|---|
| Recipe |  |  |  |
| Hostale 5052B | % | 80.0 | 70.0 |
| PEX powder (<600 μm) | % | 20.0 | 30.0 |
| Testing |  |  |  |
| meter weight profile | kg/m | 0.765 | 0.757 |
| meter weight pipe | kg/m | 54.8 | 59.6 |
| dem pipe | mm | 1304 | 1305 |
| dim pipe | mm | 1207 | 1208 |
| profile height | mm | 48.70 | 48.40 |
| profile width | mm | 71.20 | 70.70 |
| ring stiffness 3 d | kN/m$^2$ | 2.20 | 2.40 |
| ring flexibility 30 | % | ok | ok |
| tensile tests for welding - inner | N | 1340 | 1320 |
| tensile tests for welding - outer | N | 1220 | 1200 |

As will be seen from the results, ring stiffness results for the samples was on a good level. Standard weight for DN1200 SN2 is 58 kg/m. Overall meter weight results for the whole trial run and production was 57.8 kg/m.

The tensile tests for the welding shows that the polymer profiles are weldable and have a tensile force (EN13476-2) which clearly exceeds the required level of 1020 N.

Example 4

Large-diameter pipes consisting of spirally wound polymer profiles laterally welded together to form a hollow pipe wall of the large pipes (products typically of the kind supplied by Uponor Oyj under the name of Weholite®) were produced from 3-layered polymer profiles having a middle layer formed by polyethylene and containing PEX filler in the form of a master batch (MB).

Polymer profiles having the outer dimensions 62.5×93.75 mm were manufactured from the following materials:

PE pressure pipe re-granulate in the reference pipe

PE100 HE3490-LS and 150616-W01-01.3 (50%/CRP100+PEX/EVOH<600 μm) in the PEX profile Marlex 5502+"Polyone white" in the white layers and welding inner; Total XS10B in welding outer.

Co-extrusion to produce white layers on inner and outer surfaces of the profiles was carried out by co-extrusion. The PEX content in the profiles was 30%.

Profiles were welded together as disclosed in Example 3.

The PEX containing pipe was compared to a reference pipe. Table 4 gives the recipes and the test results:

TABLE 4

|  |  | Reference | Sample |
|---|---|---|---|
| Recipe |  |  |  |
| PE pressure pipe regranulate | % | 100.0 |  |
| HE 3490-LS | % |  | 40.0 |
| PEX-MB (50% PEX) | % |  | 60.0 |
| PEX content in profile |  |  | 30 |
| PEX content in MB |  | 50 | 50 |
| Testing |  |  |  |
| meter weight pipe | kg/m | 74.3 | 73.5 |
| dem pipe | mm | 1124 | 1123 |
| dim pipe | mm | 1005 | 1005 |
| ring stiffness | kN/m$^2$ | 7.49 | 7.15 |
| ring flexibility 30 | % | ok | ok |
| tensile tests for welding - inner | N | 2415 | 2899 |
| tensile tests for welding - outer | N | 2199 | 2266 |

Test results show that mechanical properties of the Weholite DN1600 SN4, with 30% PEX in the profile middle layer, is on a good level.

Thick enough layers could be extruded on the profile by adding a second co-extruder giving a Weholite PEX containing pipe with good inner and outer layer appearance.

The mechanical properties of the PEX pipes were generally good.

INDUSTRIAL APPLICABILITY

At least some embodiments of the present invention find industrial applications in the same uses as polymer articles and products, in particular as thermoplastic polymer articles and products. Thus, e.g., PEX filled polymer pipes can be used as pipes for conducting fluids, such as waste water, and as various construction parts, such as profiles, and boards and pipes of welded profiles. Such pipes can be produced by extrusion and coextrusion. Further, PEX filled polymer materials can be massive (i.e. solid) parts, such as chamber bottoms and various solid profiles. In one embodiment, such solid parts are produced by pressure. Solid parts can also be produced by other techniques such as compression moulding and hollow parts by roto moulding.

Acronyms List

| | |
|---|---|
| PEX | Cross-linked polyethylene |
| MB | Masterbatch |
| PE | Polyethylene |
| $D_{50}$ | Median diameter of the particle size distribution, in other words the value of the particle diameter at 50% in the cumulative distribution. Thus D50 = 300 µm means that half of the particles have a particle diameter greater the 300 µm and half have a particle diameter smaller than that. With a $D_{50}$ = 200 to 400 µm means that the median diameter, as defined in the foregoing, lies in the range from 200 to 400 µm. |
| EVOH | Ethylene vinyl alcohol |

REFERENCE SIGNS LIST

| | |
|---|---|
| 1, 3 | Skin layers |
| 2 | Middle layer |
| 4 | Polymer matrix |
| 5 | Filler particles |
| 12 | Structural layer |
| 14 | Polyolefin material (matrix) |
| 15 | Cross-linked polyethylene particles (filler) |

CITATION LIST

Patent Literature

EP 0 847 842
DE 42 36 802
DE 19 503 519
US 2009/0075004
WO 2016/102341

The invention claimed is:

1. A polymer product assembly comprising a plurality of elongated polymer profiles laterally welded together, wherein said polymer profiles each comprise up to 60% by weight of a cross-linked polyethylene mixed with at least one polyolefin, the cross-linked polyethylene comprising particles having a screened particle size of less than 600 µm and a $D_{50}$ of 200 to 400 µm.

2. The polymer product assembly according to claim 1, wherein the polymer profiles have a hollow and an essentially rectangular cross-section.

3. The polymer product assembly according to claim 1, wherein said polymer profiles have a pipe wall formed by a spirally wound pipe profile of a polymer material, wherein adjacent windings of the profiles are attached to each other by welding.

4. The polymer product assembly according to claim 1, wherein further comprising a skin layer on at least one outermost surface of the profiles, and wherein the skin layer consists of non-cross-linked polyolefin.

5. The polymer product assembly according to claim 1, wherein the cross-linked polyethylene is derived from post-industrial waste or pre-consumer materials.

6. The polymer product assembly of claim 1, wherein the polymer profiles each comprise 5 to 60 parts by weight of the cross-linked polyethylene to 40 to 95 parts by weight of the at least one thermoplastic matrix polymer.

7. The polymer product assembly of claim 1, wherein the polymer profiles each comprise 15 to 40 parts by weight of the cross-linked polyethylene to 60 to 85 parts by weight of the at least one thermoplastic matrix polymer.

8. The polymer product assembly of claim 1, wherein the polymer profiles each comprise from 10 to 60% by weight of the cross-linked polyethylene mixed with the at least one polyolefin.

9. The polymer product assembly of claim 1, wherein the cross-linked polyethylene particles have a moisture content of 0.1 to 5% by weight.

10. The polymer product assembly of claim 1, wherein the cross-linked polyethylene particles comprise less than 10% by weight of particles having a screened size of less than 200 µm and less than 10% by weight particles having a screened size greater than 400 µm.

* * * * *